(12) United States Patent  (10) Patent No.: US 8,286,923 B2
Kobayashi et al.  (45) Date of Patent: Oct. 16, 2012

(54) HOLDING TOOL FOR ELONGATED MEMBER

(75) Inventors: Yuji Kobayashi, Utsunomiya (JP); Yasuo Yamamoto, Yokohama (JP)

(73) Assignee: Nifco Inc., Yokohama-Shi (JP)

( * ) Notice: Subject to any disclaimer, the term of this patent is extended or adjusted under 35 U.S.C. 154(b) by 1710 days.

(21) Appl. No.: 11/204,038

(22) Filed: Aug. 16, 2005

(65) Prior Publication Data

US 2006/0060725 A1   Mar. 23, 2006

(30) Foreign Application Priority Data

Aug. 24, 2004  (JP) ................................. 2004-243967

(51) Int. Cl.
  *F16L 3/08* (2006.01)
  *F16L 3/16* (2006.01)
(52) U.S. Cl. ..................... 248/74.2; 248/68.1; 248/74.1; 24/530
(58) Field of Classification Search .................... 248/49, 248/74.2, 74.3, 68.1, 48.1, 51, 55, 62–63, 248/65, 230.97; 174/49, 72, 154, 135, 68.1; 24/487, 510, 16 PB, 530, 542, 545; 403/309, 403/313, 344

See application file for complete search history.

(56) References Cited

U.S. PATENT DOCUMENTS

| 3,074,675 | A | * | 1/1963 | Brown | 248/74.3 |
| 3,906,592 | A | * | 9/1975 | Sakasegawa et al. | 248/68.1 |
| 4,089,087 | A | * | 5/1978 | Heitman | 285/124.2 |
| 4,623,102 | A | * | 11/1986 | Hough, Jr. | 248/68.1 |
| 4,881,705 | A | * | 11/1989 | Kraus | 248/74.2 |
| 5,815,894 | A | * | 10/1998 | Soriano | 24/510 |
| 6,732,983 | B1 | * | 5/2004 | Blake et al. | 248/74.2 |
| 7,071,418 | B2 | * | 7/2006 | Brockman et al. | 174/154 |
| 2006/0060725 | A1 | * | 3/2006 | Kobayashi et al. | 248/49 |

* cited by examiner

*Primary Examiner* — Tan Le
(74) *Attorney, Agent, or Firm* — Manabu Kanesaka

(57) ABSTRACT

A holding tool for an elongated member includes a connecting member to be attached to an attachment member, a first holding part for holding the elongated member comparatively tightly, and a second holding part for holding the elongated member with a prescribed space therearound. A gap is formed between the first and second holding parts so that the elongated member can move from the first holding part to the second holding part.

7 Claims, 3 Drawing Sheets

HOLDING TOOL FOR ELONGATED MEMBER

BACKGROUND OF THE INVENTION AND RELATED ART STATEMENT

The present invention relates to a holding tool for an elongated member, and in particular, it relates to a holding tool for temporarily fastening onto a rod-shaped body or cord-shaped body when conveying in a subassembly state.

For example, in an electric sliding door of an automobile, the electric motor and the door are linked by a drive transmission cable in order to drive the door to open and close by the rotary force of the electric motor. Also, a holding tool having a ring-shaped part for running the cable therethrough is used in order to hold the cable against the door or vehicle body with a prescribed space therebetween.

Meanwhile, in order to simplify parts management on the automobile assembly line, a drive device subassembly including the electric motor and the cable is conveyed in a state that a holding tool is pre-attached to the cable. At this time, it is necessary to temporarily fasten the holding tool so that the tool does not move greatly from a prescribed position of the cable, and conventionally, adhesive tape has been used as this temporary fastening means.

However, with this temporary fastening means of the prior art, the operation of affixing adhesive tape cut to a suitable length and the operation of discarding the peeled-off tape are necessary. Because these operations are wasted operations that do not contribute at all to automobile manufacturing, improvement has been anticipated.

This invention has been made to solve such inconvenience of the prior art, and it is an object of the invention to provide a holding tool for rod-shaped body or cord-shaped body that can easily perform temporary holding on a held member and moving and holding to a proper position during assembly.

Further objects and advantages of the invention will be apparent from the following description of the invention.

SUMMARY OF THE INVENTION

In order to solve such problem, in a first aspect of the present invention, the holding tool for rod-shaped member or cord-shaped member (for example cable) comprises a part for coupling (clip) on an attachment receiving body (for example vehicle body), a first holding part for holding a rod-shaped or cord-shaped member comparatively tightly, and a second holding part for holding the held member with a prescribed space therebetween, and a gap in which the held member is capable of moving is opened between the first holding part and the second holding part. By this, after the held member is temporarily fastened by the first holding part and is conveyed, and is assembled into the target object, the held member can be moved in the second holding part with a space therebetween and can be held in the proper position.

Also, in a second aspect of the present invention, the first and second holding parts are formed between a movable part and a fixed part in which each one end is connected by means of a hinge and the other end has an interlocking means (protruding piece, hook ). In a third aspect of the invention, the first holding part has a restraining piece which is elastically deformed toward a direction widening the gap when a prescribed force is applied, and in a fourth aspect of the invention, the first holding part has a raised line in a direction orthogonal to the axial line of the held member.

By the present invention as such, because temporary fastening of the holding tool onto the held member and moving to the proper position during assembly can be performed easily, wasted operations are eliminated, and a contribution can be made to the improvement of productivity. In particular, the attachment of the holding tool onto the held member can be easily made by making the first and second holding parts capable of opening and closing as a construction formed of a fixed part and a movable part with the respective ends connected by a hinge. Thus, temporary fixing and holding in a state when external force is not applied are increased by providing a restraining piece that is elastically deformed when a prescribed force is applied, and prevention of shifting on the axial line of the held member can be assured by the raised line in the direction orthogonal to the axial line of the held member.

DETAILED DESCRIPTION OF PREFERRED EMBODIMENTS

The present invention is explained in detail below based on the attached drawings.

Figure 1:
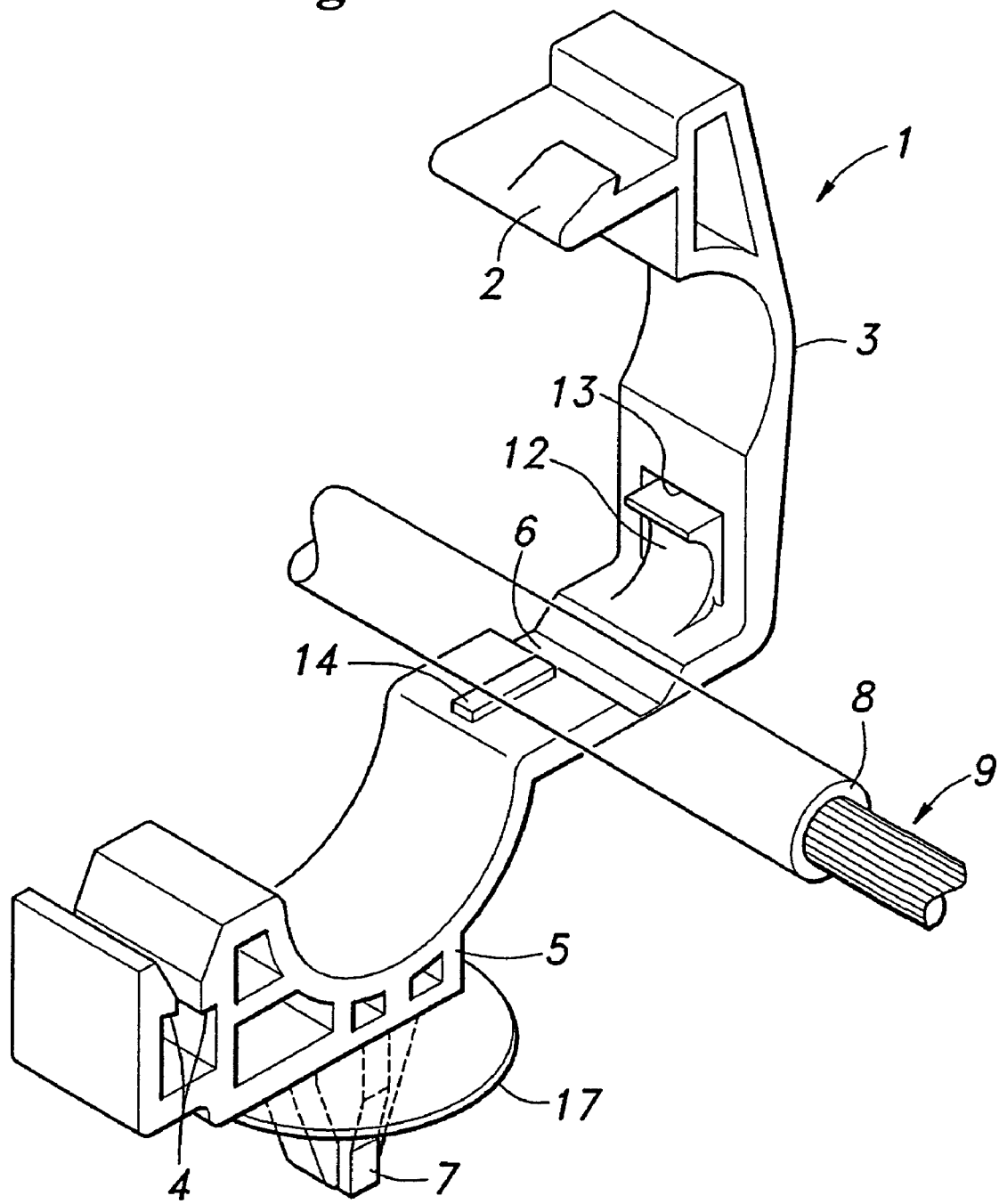
FIG. 1 is an overall perspective view of a holding tool according to the present invention.
Figure 2:
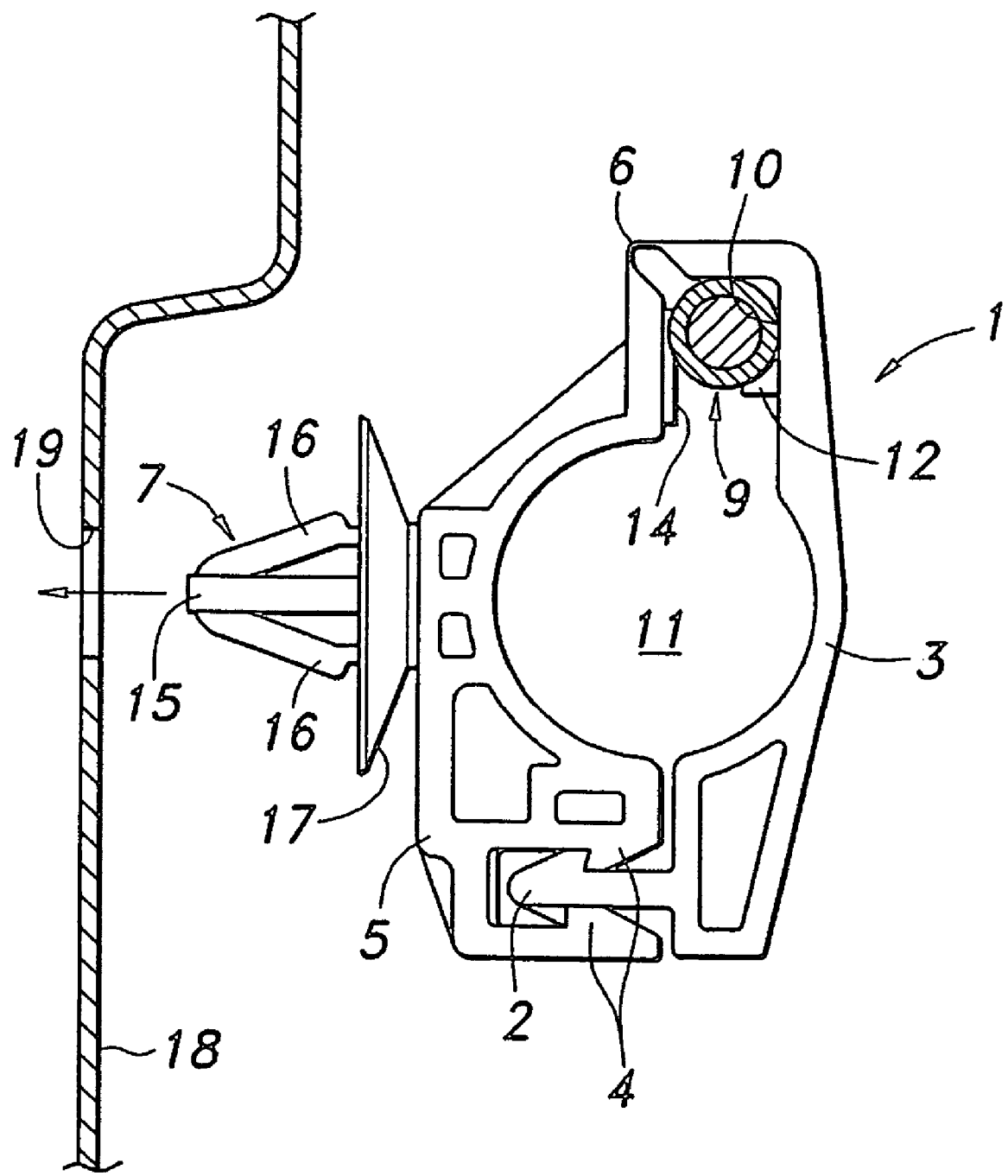
FIG. 2 is a side view showing the state in which a holding tool temporarily fastened to a cable is coupled to a vehicle body.

FIG. 1 is a perspective view showing the entirety of a holding tool for a cable according to the present invention. This holding tool 1 is integrally formed with a synthetic resin material having elasticity. The holding tool 1 includes a movable part 3 having a protruding piece 2 which is roughly arrowhead-shaped in cross-sectional shape formed on one end, a fixed part 5 having a hook 4 which elastically couples with the protruding piece 2 formed on one end, and a thin hinge 6 for connecting the movable part 3 and the fixed part 5. Also, a clip 7 which elastically couples onto an attachment receiving body, for example an automobile body, is integrally formed on the fixed part 5. Also, when the movable part 3 is joined to the fixed part 5 by interlocking the protruding piece 2 and the hook 4, as shown in FIG. 2, the first holding part 10 which can hold the cable 9 covered by an outer tube 8 comparatively tightly, and the second holding part 11 which can hold the cable 9 covered by the outer tube 8 with a prescribed space therebetween (comparatively loosely), are defined between the movable part 3 and the fixed part 5.

A semicircular restraining piece 12 which corresponds to the external contour of the outer tube 8 is formed on a part of the movable part 3 forming a part of the first holding part 10. This restraining piece 12 is formed by forming a square bracket-shaped cut 13 near the hinge 6 of the movable part 3, and it is made to have an elastic deformation. Also, a raised line 14 in the direction orthogonal to the axial line of the cable 9 is formed on a part of the fixed part 5 forming a part of the first holding part 10.

The clip 7, which is integrally formed on the fixed part 5, comprises a leg part 15 which projects out from the fixed part 5, and a pair of elastic locking pieces 16 which extends to widen in a V shape from the free end of that leg part 15, and has an arrowhead shape. The space between the free ends of the pair of elastic locking pieces 16 is made capable of contracting elastically. Also, a plate spring part 17 is formed on the base of the leg part 15.

As shown in FIG. 1, the cable 9 is laid near the hinge 6 in a state that the movable part 3 is opened, and next the movable part 3 is closed and the protruding piece 2 is coupled to the hook 4. Here, because a semicircular restraining piece 12 is formed in a part of the first holding part 10 on the side of the movable part 3, the cable 9 is held comparatively tightly in the first holding part 10 in conjunction with the raised part 14 formed on the side of the fixed part 5 biting into the outer tube 8 (see FIG. 2). Accordingly, the cable 9 is temporarily fastened securely in the first holding part 10 as long as external force is not applied, and shifting during conveying is prevented.

Figure 3:
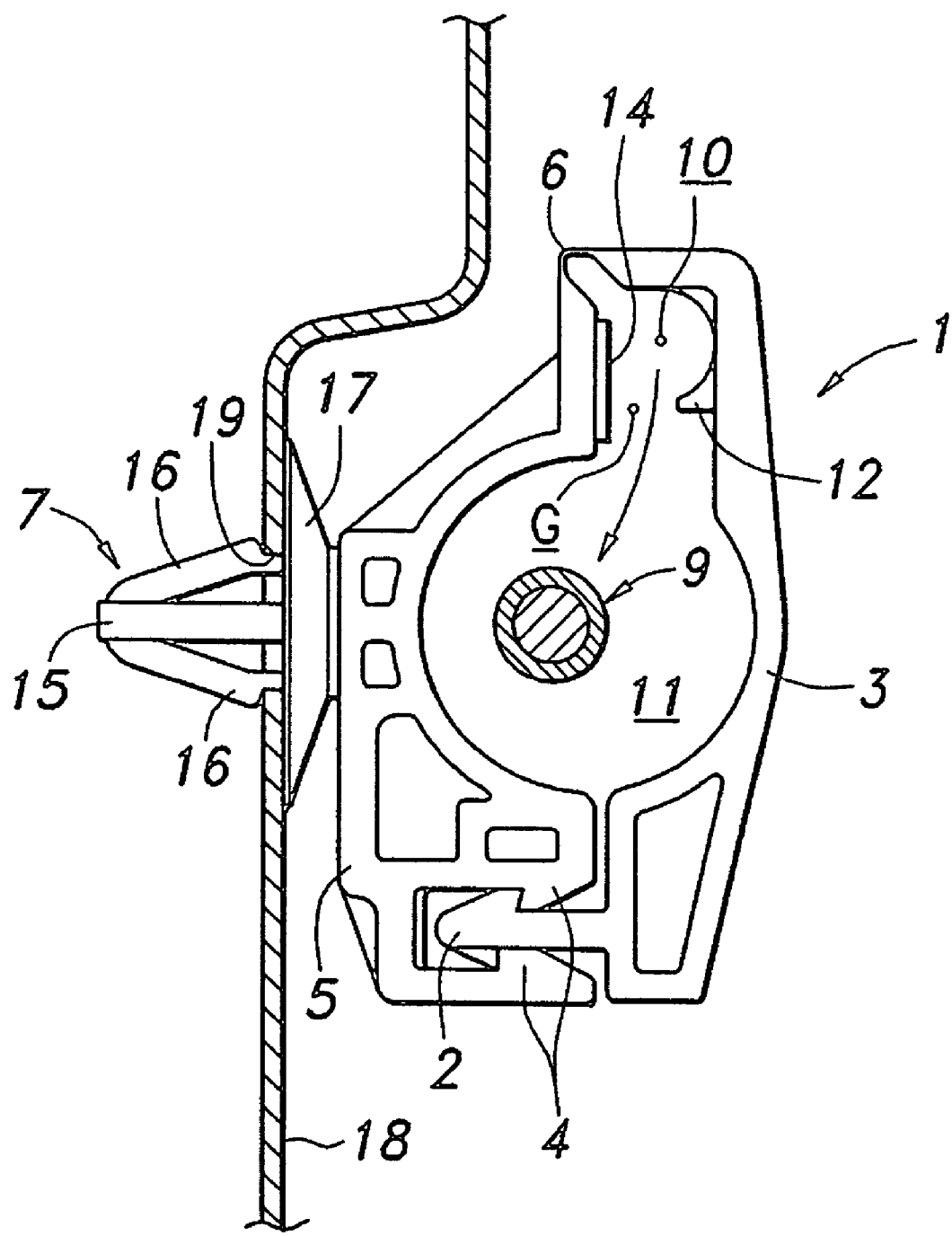
FIG. 3 is a side view showing the state in which the cable is moved from the temporarily fastened position to the proper position.

In this state temporarily fastened to the cable 9, after the holding tool 1 is coupled to the vehicle body 18 by inserting the clip 7 into a hole 19 formed on the vehicle body 18, when a prescribed force is applied to the cable 9, the cable 9 is shifted from the temporarily fastened position to the actual use position inside the second holding part 11, because the restraining piece 12 is elastically deformed outward and the gap G between the first holding part 10 and the second holding part 11 becomes wider. The cable 9 can be moved easily in the direction orthogonal to the axial line of the cable 9, that is, toward the large-diameter second holding part 11 (see FIG. 3).

Accordingly, the holding tool 1 which is temporarily fastened to the cable 9 does not shift during conveying of the drive device subassembly, and after attaching the drive device to the vehicle body, the cable 9 is moved to the second holding part 11, i.e. the proper holding position. The cable 9 can be held with a prescribed space loosely.

The holding tool pertaining to the present invention has a temporary fastening function that can be removed comparatively easily, and it is useful for holding a flexible cable, as well as rods and electric wire.

The disclosure of Japanese Patent Application No. 2004-243967 filed on Aug. 24, 2004 is incorporated in the application.

While the invention has been explained with reference to the specific embodiments, the explanation is illustrative and the invention is limited only by the appended claims.

What is claimed is:

1. A holding tool for an elongated member, comprising:
a connecting member to be attached to an attachment member,
a fixed part connected to the connecting member,
a movable part pivotally connected to the fixed part at one end thereof,
a first holding part for holding the elongated member comparatively tightly formed between the fixed part and the movable part, said first holding part having a restraining piece integrally formed with one of the fixed part and the movable part as a part thereof, said restraining piece elastically projecting toward the other of the fixed part and the movable part so that a projecting portion of the restraining piece can retract backward when a prescribed force is applied thereto,
a second holding part for holding the elongated member with a prescribed space therearound formed between the fixed part and the movable part, and
a gap formed between the first and second holding parts so that the elongated member can move from the first holding part to the second holding part.

2. A holding tool according to claim 1, further comprising a hinge formed between the movable part and the fixed part, and interlocking means for connecting the fixed part and the movable part at a side opposite to the hinge.

3. A holding tool according to claim 2, wherein said restraining piece is elastically deformable toward a direction widening the gap when the prescribed force is applied.

4. A holding tool according to claim 3, wherein said first holding part has a raised line in a direction orthogonal to an axial line of the elongated member.

5. A holding tool according to claim 4, wherein said raised line is formed on the other of the fixed part and the movable part facing the restraining piece.

6. A holding tool for an elongated member, comprising:
a connecting member to be attached to an attachment member,
a fixed part connected to the connecting member,
a movable part pivotally connected to the fixed part at one end thereof,
a first holding part for holding the elongated member comparatively tightly formed between the fixed part and the movable part, said first holding part having a restraining piece integrally formed with one of the fixed part and the movable part as a part thereof, said restraining piece elastically projecting toward the other of the fixed part and the movable part so that a projecting portion of the restraining piece can retract backward when a prescribed force is applied thereto,
a second holding part for holding the elongated member with a prescribed space therearound formed between the fixed part and the movable part, and
a gap formed between the first and second holding parts so that the elongated member can move from the first holding part to the second holding part,
wherein said restraining piece is a part of the fixed part or movable part surrounded by cutting grooves at three sides.

7. A holding tool according to claim 6, wherein said restraining piece has a curved inner surface, and said first holding part has a raised linear line facing the curved inner surface.

* * * * *